US008483680B2

(12) United States Patent
Gupta et al.

(10) Patent No.: US 8,483,680 B2
(45) Date of Patent: Jul. 9, 2013

(54) HANDLING FAILURE SCENARIOS FOR VOICE CALL CONTINUITY

(75) Inventors: Kirti Gupta, San Diego, CA (US); Manoj M. Deshpande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1192 days.

(21) Appl. No.: 12/245,076

(22) Filed: Oct. 3, 2008

(65) Prior Publication Data

US 2010/0087186 A1 Apr. 8, 2010

(51) Int. Cl.
*H04W 24/00* (2009.01)

(52) U.S. Cl.
USPC ............................. 455/424; 455/417; 455/436

(58) Field of Classification Search
USPC .................. 455/410, 414.1, 418–420, 422.1,
455/424, 552.1, 436–439, 417; 370/328,
370/338, 401, 350–358
See application file for complete search history.

(56) References Cited

U.S. PATENT DOCUMENTS

| | | | |
|---|---|---|---|
| 6,826,414 B1 | 11/2004 | Reynolds et al. | |
| 7,000,016 B1 * | 2/2006 | Vanderbeck et al. | 709/226 |
| 7,152,118 B2 * | 12/2006 | Anderson et al. | 709/245 |
| 7,565,698 B2 * | 7/2009 | Isozaki et al. | 726/26 |
| 7,885,234 B2 * | 2/2011 | Ejzak | 370/331 |
| 7,995,562 B2 * | 8/2011 | Purnadi et al. | 370/352 |
| 2005/0282575 A1 * | 12/2005 | Dorenbosch | 455/550.1 |
| 2006/0013157 A1 * | 1/2006 | Annic | 370/328 |
| 2006/0218628 A1 * | 9/2006 | Hinton et al. | 726/8 |
| 2007/0136603 A1 * | 6/2007 | Kuecuekyan | 713/185 |
| 2007/0173239 A1 * | 7/2007 | Scott et al. | 455/417 |
| 2007/0195785 A1 * | 8/2007 | Song et al. | 370/395.2 |
| 2008/0026752 A1 | 1/2008 | Flore et al. | |
| 2008/0056238 A1 * | 3/2008 | Inujima et al. | 370/352 |
| 2008/0057962 A1 * | 3/2008 | Long et al. | 455/436 |
| 2008/0090556 A1 * | 4/2008 | Coulas et al. | 455/414.1 |
| 2008/0186953 A1 * | 8/2008 | Buckley et al. | 370/352 |
| 2008/0205386 A1 * | 8/2008 | Purnadi et al. | 370/389 |
| 2008/0205413 A1 * | 8/2008 | Purnadi et al. | 370/401 |
| 2008/0267171 A1 * | 10/2008 | Buckley et al. | 370/352 |
| 2008/0268819 A1 * | 10/2008 | Zhu et al. | 455/414.1 |

(Continued)

FOREIGN PATENT DOCUMENTS

GB 2440989 A 2/2008

OTHER PUBLICATIONS

Digital cellular telecommunications system (Phase 2+); Universal Mobile Telecommunications System (UMTS); Voice call continuity between Circuit Switched (CS) and IP Multimedia Subsystem (IMS); Stage 3 (3GPP TS 24.206 version 7.5.0 Release 7); ETSI TS 124.

(Continued)

*Primary Examiner* — Cong Tran
(74) *Attorney, Agent, or Firm* — Linda G. Gunderson

(57) ABSTRACT

Receipt of a failure response message in response to a domain transfer attempt is cached at a mobile device. The mobile device retains information related to the domain to indicate that the domain does not support anchoring and, thus, does not support voice call continuity. The mobile device might not attempt domain transfer for subsequent calls in the same area. In an aspect, after expiration of a configurable interval, the mobile device can re-attempt domain transfer to determine if anchoring is now supported by the domain. If the domain now supports anchoring, the identification of the domain can be removed from the domain listing.

22 Claims, 9 Drawing Sheets

U.S. PATENT DOCUMENTS

| | | | |
|---|---|---|---|
| 2008/0291874 A1* | 11/2008 | Bae et al. | 370/331 |
| 2009/0235330 A1* | 9/2009 | Byun et al. | 726/4 |
| 2009/0262733 A1* | 10/2009 | Olson | 370/389 |
| 2010/0034166 A1* | 2/2010 | Olvera-Hernandez | 370/331 |
| 2010/0177691 A1* | 7/2010 | Patil et al. | 370/328 |
| 2011/0009120 A1* | 1/2011 | You et al. | 455/436 |
| 2011/0013597 A1* | 1/2011 | Hwang et al. | 370/331 |

OTHER PUBLICATIONS

International Search Report and Written Opinion—PCT/US2008/082215—ISA/EPO—Feb. 25, 2010.

Taiwan Search Report—TW097143268—TIPO—May 3, 2012.

\* cited by examiner

HANDLING FAILURE SCENARIOS FOR VOICE CALL CONTINUITY

BACKGROUND

I. Field

The following description relates generally to wireless communications systems and more particularly to voice call continuity.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video and so forth can be provided through wireless communication systems. A typical wireless communication system, or network, can provide multiple users access to one or more shared resources. A system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless communication networks are established through a mobile device communicating with a base station or access point. The access point covers a geographic range or cell and, as the mobile device is operated, the mobile device can be moved in and out of these geographic cells.

Traditional wireless communication networks are circuit switch networks. In circuit switch networks, when a data transfer (e.g., voice call or other type of communication) is initiated, the data transfer is routed to a cellular infrastructure, such as a Base Station Controller (BSC) or mobile switching center (MSC). After routing to the cellular infrastructure, the data transfer is routed to the recipient, which can be another cellular network, a public switch telephone network, and so on.

Recently, Voice over Internet Protocol (VoIP) technology has been advancing and IP-Multimedia Subsystem (IMS) technology has been developed. Some networks are actively deploying VoIP and/or IMS technology. This has resulted in at least two networks: the legacy circuit switch network and the new VoIP/IMS network. Since the VoIP/IMS network is deployed from the ground up (e.g., an entirely new infrastructure is built), for some time the coverage provided by the VoIP/IMS network will be limited and/or there will be pockets of such coverage at various locations.

Further, in a Voice Call Continuity (VCC) architecture, all calls originated by VCC subscribers are anchored at the VCC Application Server (AS). In some networks, operators may choose to disable anchoring of calls (Selective Anchoring). Operators may also choose to disable anchoring of calls for roaming subscribers. The calls originated in the Circuit Switch (CS) domain are anchored using Customized Applications for Mobile Network Enhanced Logic (CAMEL) triggers and/or Wireless Intelligent Network (WIN) triggers by the Mobile Switching Center (MSC). On the other hand, calls originated in the IP-Multimedia Subsystem (IMS) domain are anchored utilizing an initial Filter Criteria (iFC) at the Serving-Call Session Control Function (S-CSCF).

Due to the limited and/or non-contiguous nature of IMS networks, when a mobile device attempts to transfer a communication (e.g. voice call, data communication, and so forth) between a circuit switch network and an IMS network (or from the IMS network to the circuit switch network), there is a potential for a communication failure. For example, the call can dropped when crossing the network boundaries and/or when the call is handed off between the two networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with handling failure scenarios. For example, when a mobile device initiates a domain transfer for a call that was not anchored at a Voice Call Continuity Application Server (VCC AS), the VCC AS responds with an area failure response message. For example, the nature of selective anchoring (due to operator policy, roaming scenarios) can be such that anchoring is not supported in a subset of a cellular network (identified by Mobile Country Code (MCC), Mobile Network Code (MNC), System Identification (SID), Network Identification (NID), Packet Zone Identification (PZID), and so forth)). When the call/session is not anchored and the mobile device attempts to perform domain transfer, the domain transfer attempt may fail. On receipt of the failure response message, the mobile device should cache the MCC, MNC, SID, NID, or PZID area as an area that does not support anchoring and thus, does not support voice call continuity. The mobile device does not attempt domain transfer for subsequent calls in the same area and/or does not initiate unnecessary domain transfer requests if the call is not anchored at the VCC AS, after attempting once and receiving a failure notification. In accordance with some aspects, the mobile device can attempt the call and/or the domain transfer request after expiration of a configurable amount of time.

An aspect relates to a method for handling failure scenarios for voice call continuity. The method includes receiving a failure response message that indicates a failure during a transfer from a first domain to a second domain and retaining an identification of the first domain in a network listing. The retained identification indicates that the first network does not support call anchoring.

Another aspect relates to a wireless communications apparatus that includes a memory and a processor. The memory retains instructions related to receiving a failure response message from a first network and retaining an identification of the first network in a network listing. The failure response message indicates a failure during a transfer from a first domain to a second domain. The network listing includes identities of networks that do not support call anchoring. The processor is coupled to the memory and is configured to execute the instructions retained in the memory.

A further aspect relates to a wireless communications apparatus that manages failure scenarios for voice call continuity. The wireless communications apparatus includes means for receiving a failure response message and means for retaining an identification of the first network in a network listing. The failure response message indicates a failure during a transfer from a first network to a second network. The retained identification indicates that the first network does not support call anchoring.

Yet another aspect relates to a computer program product that includes a computer-readable medium. The computer-readable medium includes a first set of codes for causing a computer to receive a failure response message and a second set of codes for causing the computer to retain an identification of the first domain in a network listing. The retained identification indicates that the first network does not support call anchoring. The failure response message indicates a failure during a transfer from a first domain to a second domain.

Still another aspect relates to at least one processor configured to manage failure scenarios in a wireless communications environment. The processor includes a first module for receiving a failure response message and a second module for retaining an identification of the first domain in a network listing. The failure response message indicates a failure during a transfer from a first domain to a second domain. The retained identification indicates that the first network does not support call anchoring.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
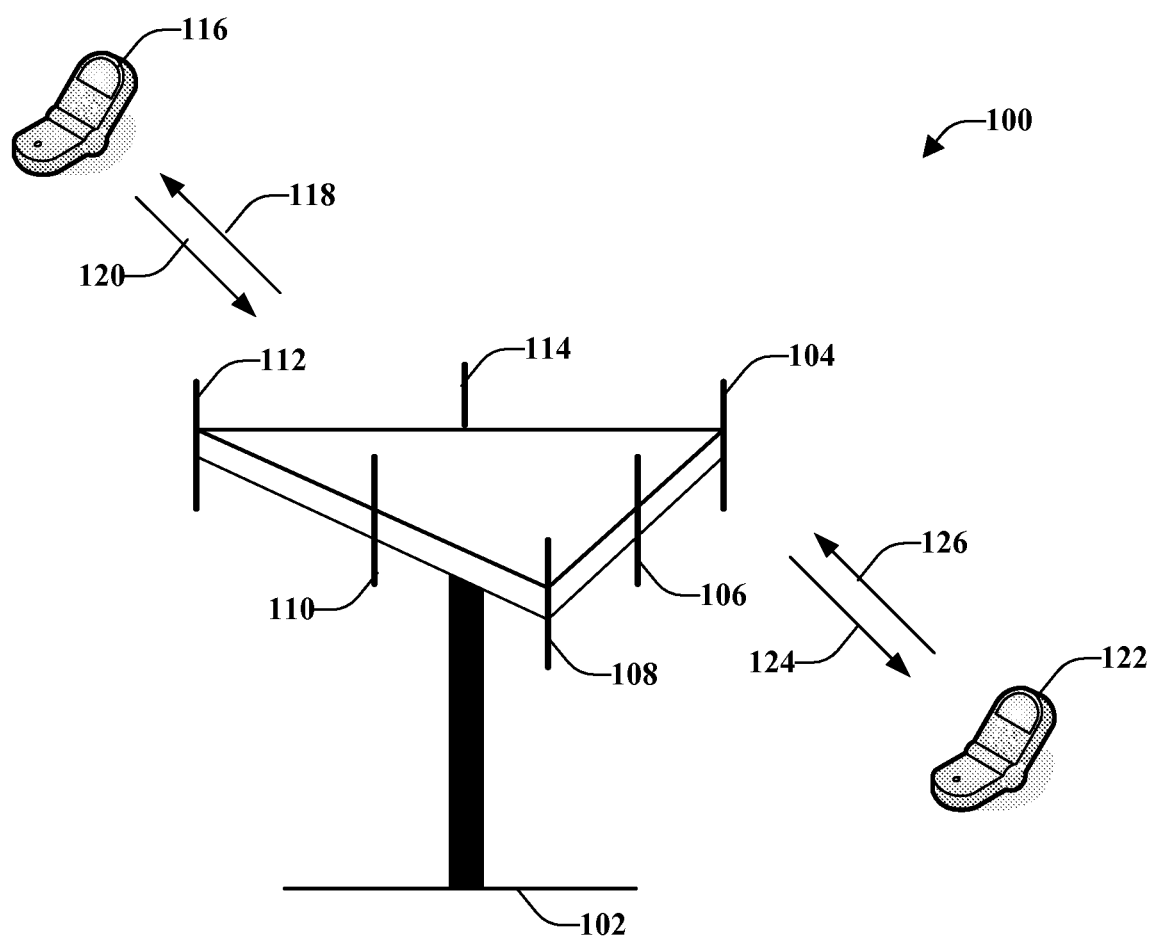
FIG. 1 illustrates a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1 illustrates a multiple access wireless communication system 100 according to one or more aspects. A wireless communication system 100 can include one or more base stations in contact with one or more user devices. Each base station provides coverage for a plurality of sectors. A three-sector base station 102 is illustrated that includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 118 and receive information from mobile device 116 over reverse link 120. Forward link (or downlink) refers to the communication link from the base stations to mobile devices, and the reverse link (or uplink) refers to the communication link from mobile devices to the base stations. Mobile device 122 is in communication with antennas 104 and 106, where antennas 104 and 106 transmit information to mobile device 122 over forward link 124 and receive information from mobile device 122 over reverse link 126. In a FDD system, for example, communication links 118, 120, 124, and 126 might utilize different frequencies for communication. For example, forward link 118 might use a different frequency than the frequency utilized by reverse link 120.

Each group of antennas and/or the area in which they are designated to communicate may be referred to as a sector of base station 102. In one or more aspects, antenna groups each are designed to communicate to mobile devices in a sector or the areas covered by base station 102. A base station may be a fixed station used for communicating with the terminals.

In communication over forward links 118 and 124, the transmitting antennas of base station 102 can utilize beamforming in order to improve a signal-to-noise ratio of forward links for the different mobile devices 116 and 122. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

In accordance with some aspects, system 100 is configured to enable each mobile device 116, 122 to determine whether a call originated by the mobile device was anchored at the VCC application or not anchored before initiating domain transfer procedures. System 100 can further mitigate a re-initiate attempt for domain transfers by a mobile device 116, 122 for a call from a CS domain to a Packet Service (PS) domain (or from a PS domain to a CS domain) if the call is not anchored at the VCC Application server.

Figure 2:
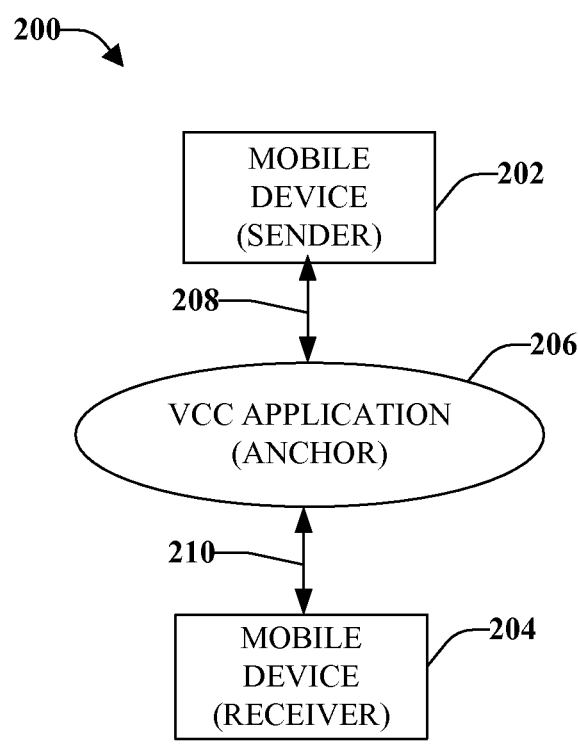
FIG. 2 illustrates a system for communication between mobile devices according to an aspect.

FIG. 2 illustrates a system 200 for communication between mobile devices according to an aspect. A first mobile device (sender) 202 initiates a communication (e.g., voice call, data exchange, session, and so forth) with a second mobile device (receiver) 204. The communication is routed through a base station or VCC application server (anchor) 206. There are two legs or links in the communication: a first leg 208 from the sender device 202 to the server 206 and a second leg 210 from the server 206 to the receiver device 204. As the mobile device 202 is operated, it can be moved to an area served by another domain (not the domain in which the communication was initiated). In accordance with some aspects, either the sender 202 or the receiver 204 of the call/session may reside outside the mobile network and in the network, such as a Public Switched Telephone Network (PSTN) or the Internet.

Figure 3:
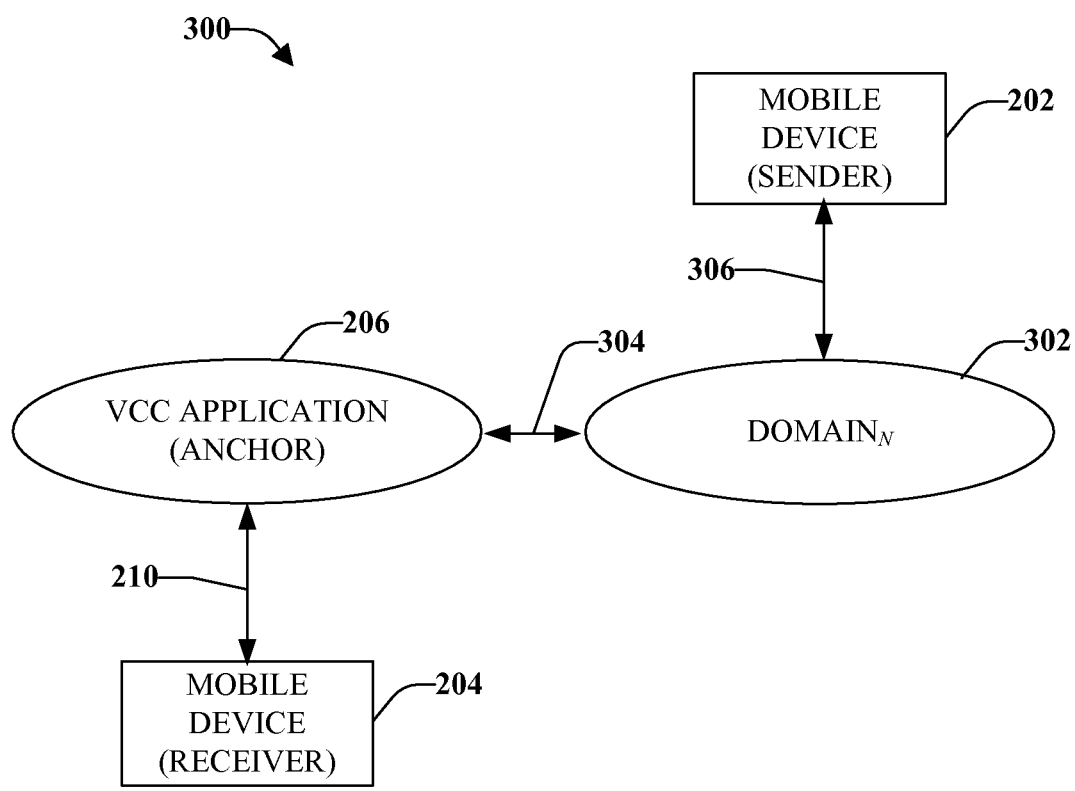
FIG. 3 illustrates a system that utilizes call anchoring to provide call continuity according to one or more aspects.

FIG. 3 illustrates a system 300 that utilizes call anchoring to provide call continuity according to one or more aspects. This figure is similar to the above figure and includes a sender device 202 that communicates with a receiver device 204 through a server 206. However, since the sender device 202 has been moved, the leg between the sender device 202 and the server 206 is no longer available. Thus, since, in this example, the communication is anchored at the server 206 (e.g., in the call network), when the mobile device 202 cross a boundary between the two networks (e.g., server and another domain), the mobile device makes a call to the anchoring server 206 (e.g., VCC application server or VCCS). The VCCS bridges the incoming call (e.g., the new call) with the preexisting leg of the call and establishes a link between the server 206 and another domain, labeled domain 302, where N is an integer. This link is illustrated at 304. There is also a link 306 between the sender device 202 and the new domain 302 and, since in this example the call was anchored, the handoff is successful. If the communication is not anchored by the server 206, there is no call continuity because the link(s) with the new domain 302 cannot be established, resulting in a communication failure.

With conventional systems, the mobile device 202 does not know a priori when establishing the communication whether the communication will be anchored or not anchored. This can cause problems during roaming, when crossing to a different operator's network, in pockets of the operator's network serving mobile device 202, and so forth. Thus, mobile device 202 might believe the call is anchored and, on a handover attempt, the mobile device makes the call to the VCCS and, since the call was not anchored, the existing call fail (e.g., dropped call). This can cause frustration to the user as well as other problems (e.g., lost data).

Figure 4:
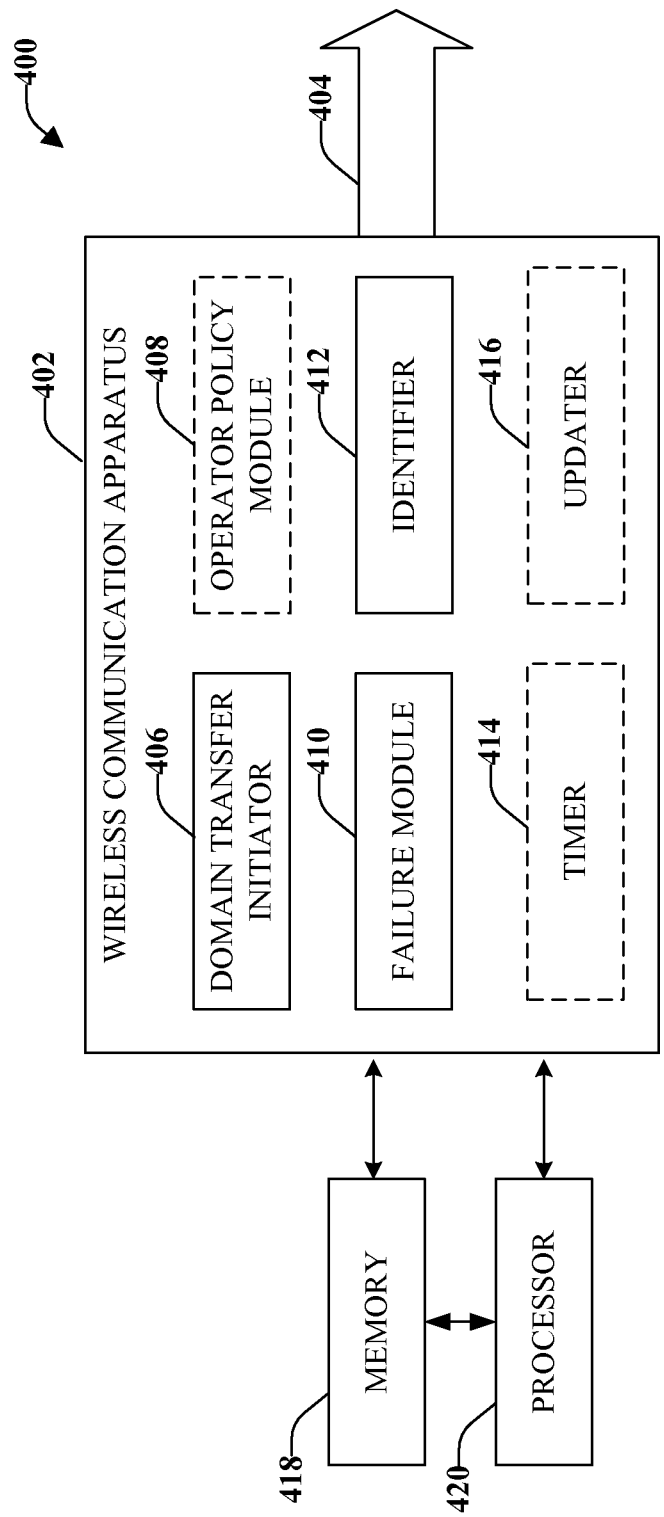
FIG. 4 illustrates a system that detects a failure scenario and manages calls as a function of the detected failure in accordance with an aspect.

With reference now to FIG. 4, illustrated is a system 400 that detects a failure scenario and manages calls as a function of the detected failure in accordance with an aspect. System 400 includes a wireless communication apparatus 402 that is shown to be transmitting data through a channel 404. Although depicted as transmitting data, wireless communication apparatus 402 can also receive data through the channel 404 (e.g., wireless communication apparatus 402 can concurrently transmit and receive data, wireless communication apparatus 402 can transmit and receive data at different times, or combinations thereof). Wireless communication apparatus 402, for example, can be an access terminal (e.g., access terminal 116 or 122 of FIG. 1, device 202 or 204 of FIG. 2 and FIG. 3), or the like.

Wireless communications apparatus 402 is configured to determine whether a call originated by apparatus 402 was anchored at a VCC application server or not anchored. This determination can be made prior to initiating domain transfer procedures. Included in wireless communications apparatus 402 is a domain transfer initiator 406 that is configured to establish a transfer from a first domain to a second domain or other subsequent domains. Domain transfer initiator 406 can attempt to establish the domain transfer with the expectation that the communication is anchored. However, in some situations the call might not be anchored.

In accordance with some aspects, wireless communications apparatus 402 includes an operator policy module 408 that is configured to obtain and/or retain knowledge regarding an operator policy related to call anchoring. The information related to the operator policy can be known for some situations. However, for other situations, the operator policy regarding call anchoring is not known (or is out of date). For example, the operator policy module 408 might not be aware of network capability of a visiting network (e.g., whether the Visiting Mobile Switching Center (VMSC) has support for CAMEL triggers or whether the VMSC does not have support for CAMEL triggers). Not having knowledge of the operator policy can lead to failure scenarios when the wireless communications apparatus 402 attempts to initiate domain transfer for a communication that was not originally anchored. It should be noted that the operator policy module 408 is optional, as denoted by the dashed box.

If the operator policy is not known (e.g. an operator policy module 408 is not utilized) or for other reasons, a domain transfer initiator 406 might attempt a domain transfer when the call is not anchored. If the call is not anchored, there can be a communication failure and a failure message is received by a failure module 410, which can be associated with a receiver. The failure message can be received from a VCC Application Server, for example.

At substantially the same time as receiving the failure message, an identifier 412 can gather an information related to an identification of the domain or network (e.g., SID, NID, Mobile Country Code (MCC), Mobile Network Code (MNC), and so on) that did not provide call anchoring. The identifier 412 can include (or have access to) a database or other storage medium in which the identification of the domain can be retained. One or more domain identifications can be retained in a network listing, wherein inclusion in the network listing indicates that the network (or domain) does not support call anchoring. In accordance with some aspects, an optional separate network listing can be maintained that includes the identification of networks that are known to support call anchoring.

Later, when domain transfer initiator 406 attempts to transfer another communication from one domain to another domain, the network listing is reviewed to determine whether the network supports call anchoring. If the network does not support call anchoring (e.g., the network is identified in the network listing), an attempt for domain transfer is not initiated by domain transfer initiator 406. Thus, communications from a PS domain to a CS domain and/or communications from a CS domain to a PS domain are not attempted if the communication is not anchored at the VCC Application Server. If the network identification is not included in the network listing, it can indicate that the network supports call anchoring or that information related to the network is not available. Thus, if the network identification is not included in the database, domain transfer initiator 406 can attempt domain transfer.

In accordance with some aspects, wireless communication apparatus 402 includes a module for periodically checking with networks included in the network listing to confirm whether a network still does not support call anchoring. To check with one or more networks, a timer 414 can be configured to track a configurable interval and, after expiration of the configurable interval, another domain transfer can be selectively attempted from the network that is being checked. In accordance with some aspects, after expiration of the timer, the wireless communication apparatus 402 assumes that the domain supports a call continuity feature. If the domain transfer is successful, the identification of the network can be removed from the network listing by updater 416. It should be noted the timer 414 and updater 416 are optional, as denoted by the dashed boxes.

Additionally or alternatively, a signaling message can be received from one or more networks indicating that the network sending the message supports call anchoring. In accordance with this aspect, the signaling message is received by wireless communications apparatus 402 and, at substantially the same time as receiving the message, updater 416 can update the network listing, such as by removing the identification of the network sending the message from the network listing (if the network identifier is included in the listing). According to some aspects, a separate listing of networks that do support call anchoring is provided and the identification of network sending the message can be included in the separate listing.

System 400 can include memory 418 operatively coupled to communication apparatus 402. Memory 418 can be external to communication apparatus 402 or can reside within communication apparatus 402. Memory 418 can store information related to preparing to initiate a communication in the first network, determining if the first network identity is included in the network listing, and avoiding initiation of the communication in the first network if the first network identity is included in the network listing. Further, memory 418 can store other suitable information related to signals transmitted and received in a communication network. A processor 420 can be operatively connected to communication apparatus 402 (and/or memory 418) to facilitate analysis of information related to handling failure scenarios for voice call continuity. Processor 420 can be a processor dedicated to analyzing and/or generating information received by communication apparatus 402, a processor that controls one or more components of system 400, and/or a processor that both analyzes and generates information received by communication apparatus 402 and controls one or more components of system 400.

Memory 418 can store protocols associated with voice call continuity, taking action to control communication between communication apparatus 402 and other devices such that system 400 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 320 of the disclosed aspects are intended to comprise, without being limited to, these and other suitable types of memory.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
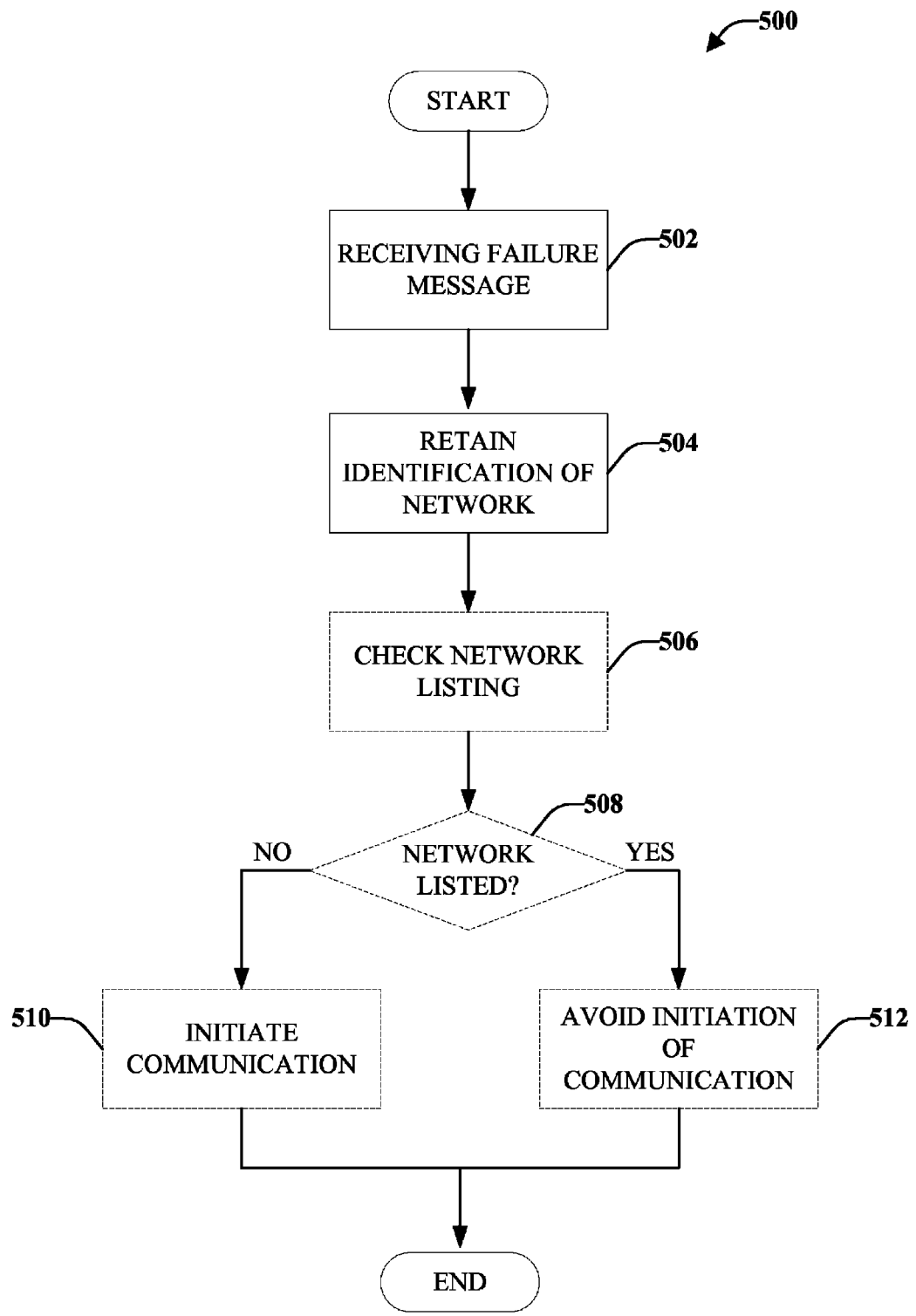
FIG. 5 illustrates a method for handling failure scenarios for voice call continuity in accordance with the various aspects disclosed herein.

FIG. 5 illustrates a method 500 for handling failure scenarios for voice call continuity in accordance with the various aspects disclosed herein. In some situations, communications cannot be transferred from one domain to another domain, such as from a CS domain to a PS domain or from a PS domain to a CS domain, for example, if the serving domain does not support call anchoring. If call anchoring is not supported, there is no call continuity and the user can experience a communication failure (e.g., dropped communication).

Method 500 starts, at 502, when a communication failure is experienced during a domain transfer and a failure message is received. The domain transfer can occur when a first mobile device initiates communication with a second mobile device. As the first mobile device is operated the first mobile device can be moved to a different domain (e.g., away from the first domain). The second mobile device can also be moved among various domains. As the first mobile device is moved, a communication with a new domain (e.g., the domain to which the device is moved) can be established as a link between the first mobile device, the first network, and the second mobile device. If the first domain supports anchoring, the communication can be relayed to the second domain. However, if the first domain does not support anchoring, the communication cannot be relayed to the second domain and there is a communication failure (e.g., dropped call). This communication failure is detected, at 502, such as upon receipt of a failure message. In accordance with some aspects, the first network is a circuit switch network and the second network is a Packet Service (PS) network. According to some aspects, the first network is a Packet Service (PS) network and the second network is a circuit switch network.

Based on the communication failure, at 504, an identification of the first domain is retained in a network listing. The network can be identified by various identifiers (e.g. MCC, MNC, SID, NID, PZID, and the like). The first domain identification can be retained in a network listing, which can be a database, a storage, media, and so forth. A network identified in the network listing indicates that the network does not support call anchoring.

In accordance with some aspects, the first mobile device can utilize the network listing when another communication is to be made to determine if the network in which the call will be made is included in the listing. Thus, at 506, the network listing can be checked for the identification of the network when a second communication is to be initiated. At 508, a determination is made whether the network is included in the network listing. If the current network is not included in the network listing ("NO"), it can indicate that the network supports call anchoring or that the mobile device does not have information related to whether the network support call anchoring or does not support call anchoring. Thus, the call is initiated, at 510. If the current network is included in the listing ("YES"), the network does not support call anchoring and initiation of the call is avoided, at 512.

In accordance with some aspects, if the communication is within a network that does not support anchoring and thus does not support call continuity (e.g., the communication was handed off to the network), the mobile device will not attempt a domain transfer if the network is included in the network listing. In this case, since it is known that call continuity is not supported, the mobile device will delay transferring to another domain (e.g., IMS domain) until the communication is completed. Once the communication is complete, the mobile device can begin utilizing the IMS domain.

Figure 6:
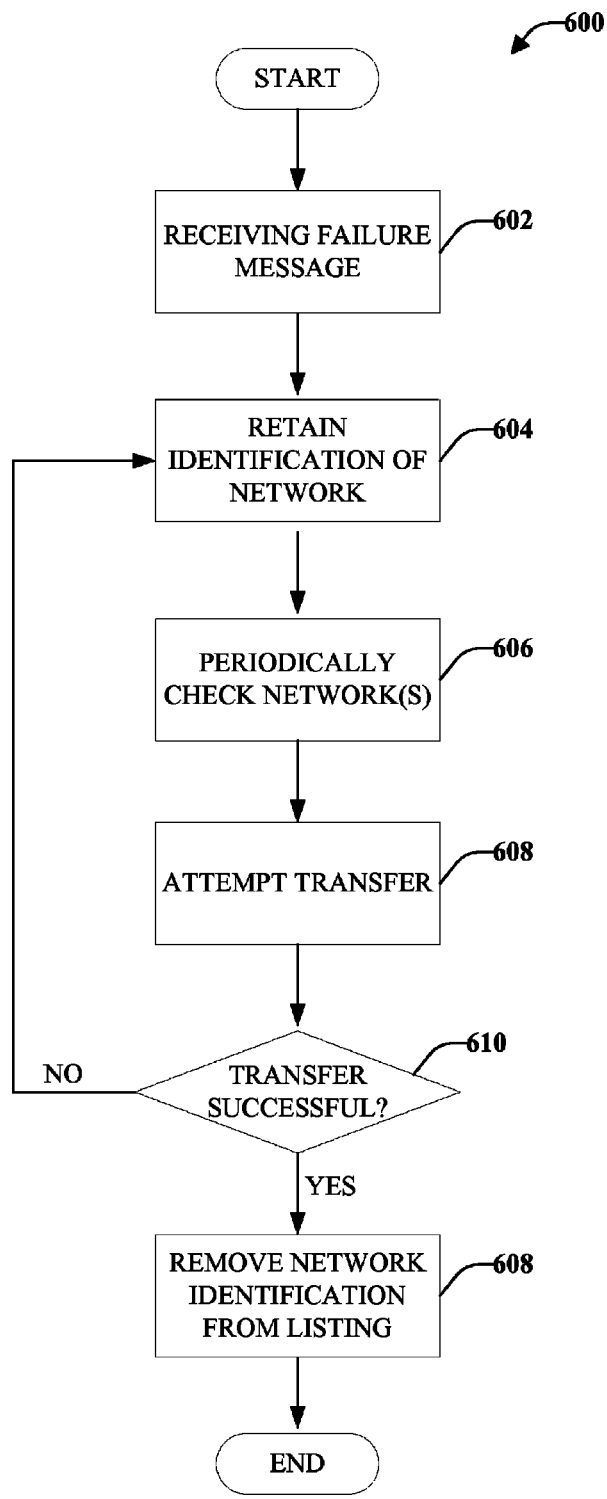
FIG. 6 illustrates a method for monitoring networks to mitigate call failure scenarios during domain transfer in accordance with an aspect.

FIG. 6 illustrates a method 600 for monitoring networks to mitigate call failure scenarios during domain transfer in accordance with an aspect. At 602, a communication failure message is received, such as during a domain transfer attempt that is not successful. The failure can occur if the network in which the call was originated in does not support anchoring and, thus, does not support call continuity. At 604, an identification of the network (originating network) is retained in a network listing, which is a listing or database that contains information related to networks that are known to not support anchoring.

However, due to the nature of communication networks, a domain that did not support call anchoring might be modified and/or updated to support anchoring. Thus, a device should periodically check, at 606, to determine if a network now supports call anchoring. Periodic checking can include attempting another transfer from the first network to another network, at 608. At 610, a determination is made whether the second transfer was successful (indicating that the first network supports call anchoring). If the transfer is not successful ("NO"), method 600 continues, at 604 and the identification of the first network is retained in the network listing.

If the determination, at 610, is that the transfer is successful ("YES"), method 600 continues, at 612, and the identity of the first network is removed from the network listing. By removing the network identification from the network listing, the next time a call is to be initiated in the network (e.g., domain), the call will be made since the network now supports call continuity.

In accordance with some aspects, if the first network supports call anchoring (e.g., the transfer is successful, at 602, and/or the second transfer is successful, at 608), the identification of the first network is maintained in a separate network listing from the listing that is maintained for networks that do not support call anchoring. For example, one listing can be dedicated for networks that do not support call anchoring and a second listing can be maintained for networks that do support call anchoring.

Figure 7:
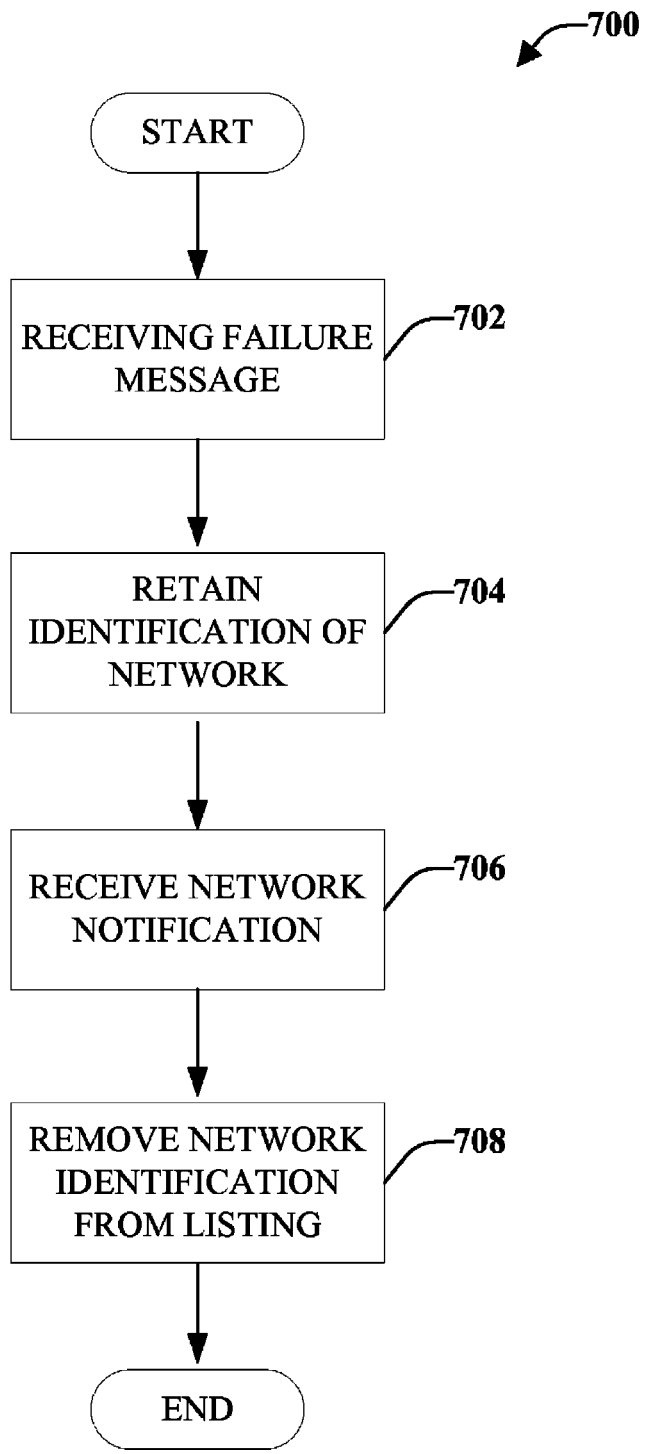
FIG. 7 illustrates a method for handling failure scenarios for voice call continuity according to aspects disclosed herein.

FIG. 7 illustrates a method 700 for handling failure scenarios for voice call continuity according to aspects disclosed herein. At 702, an unsuccessful domain transfer message is received from a network that does not support call anchoring. An identification of the network from which the domain transfer message was received is maintained in a network listing, at 704. The network listing can include a database or other means of retaining the network identifications for future use.

The network that did not support call anchoring, at 702, might be updated or modified in order to support call anchoring. If the network has been updated/modified and now supports call anchoring, the network can transmit a signaling message or notification, which is received, at 706. The signaling message indicates that the network supports anchoring. The signaling message can be a dedicated message and/or a broadcast message. At 708, the network identification can be removed from the network listing based upon the received signaling message.

Figure 8:
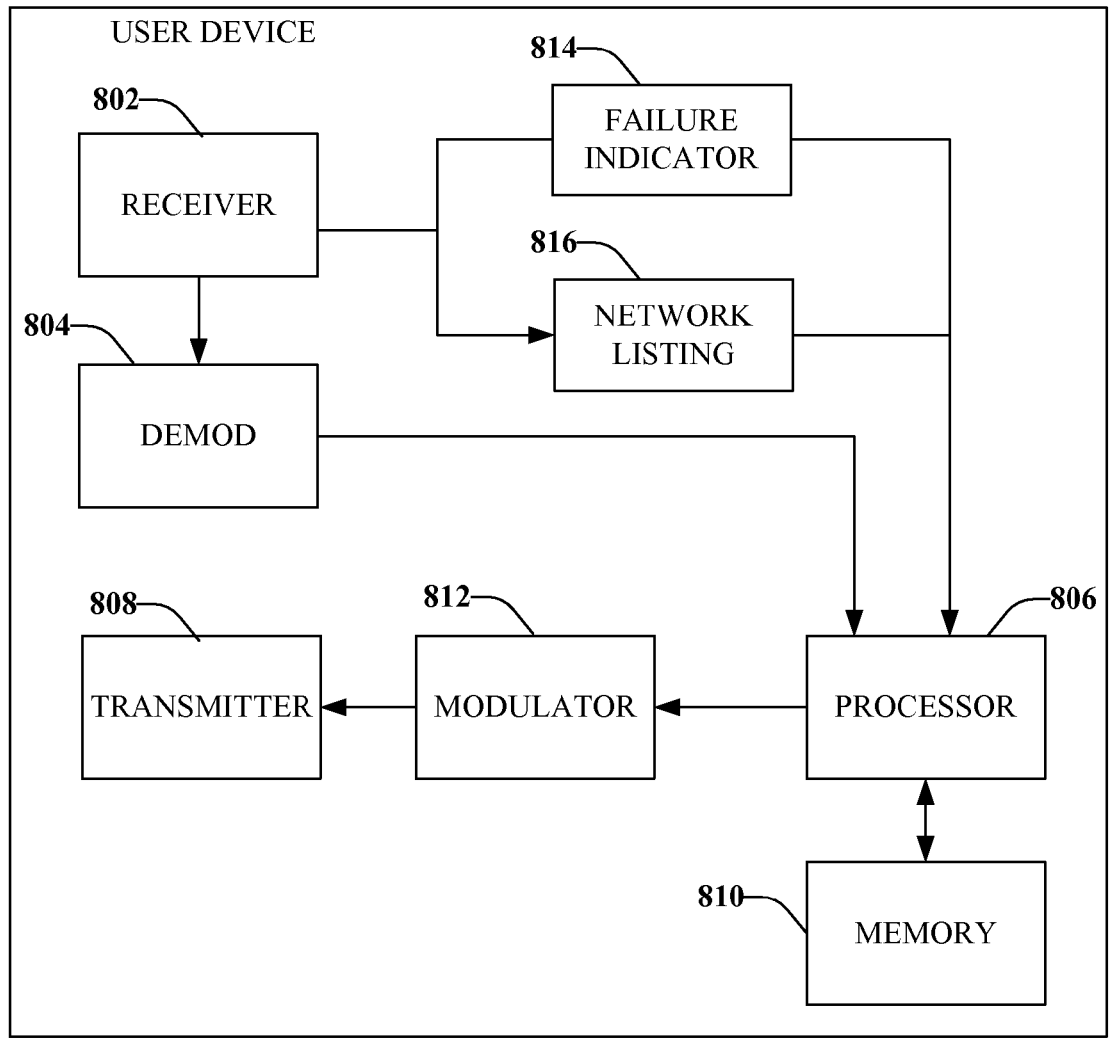
FIG. 8 illustrates a system that facilitates control of a failure scenario for call continuity in accordance with one or more of the disclosed aspects.

With reference now to FIG. 8, illustrated is a system 800 that facilitates control of a failure scenario for call continuity in accordance with one or more of the disclosed aspects. System 800 can reside in a user device. System 800 includes a receiver 802 that can receive a signal from, for example, a receiver antenna. The receiver 802 can perform typical actions thereon, such as filtering, amplifying, downconverting, and so forth, the received signal. The receiver 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of user device 800, analyze information received by receiver 802, generate information for transmission by transmitter 808, and/or control one or more components of user device 800. Processor 806 can include a controller component capable of coordinating communications with additional user devices.

User device 800 can additionally comprise memory 808 operatively coupled to processor 806 and that can store information related to coordinating communications and any other suitable information. Memory 810 can additionally store protocols associated with controlling failure scenarios. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 800 can further include a symbol modulator 812 and a transmitter 808 that transmits the modulated signal.

Receiver 802 is further operatively coupled to a failure indicator 814 that is configured to receive a domain transfer failure message when there is a failure when attempting to transfer from one network to another network due to call anchoring not being supported. Additionally, receiver 802 can be operatively coupled to a network listing 816 that is configured to maintain a listing of networks that do not support call anchoring. In accordance with some aspects, two listings can be maintained: a first listing to identify networks that do not support call anchoring and a second listing of known networks that do support call anchoring. The listing of networks that do not support call anchoring is utilized to mitigate re-initiating an attempt for domain transfers by a user device 800.

Figure 9:
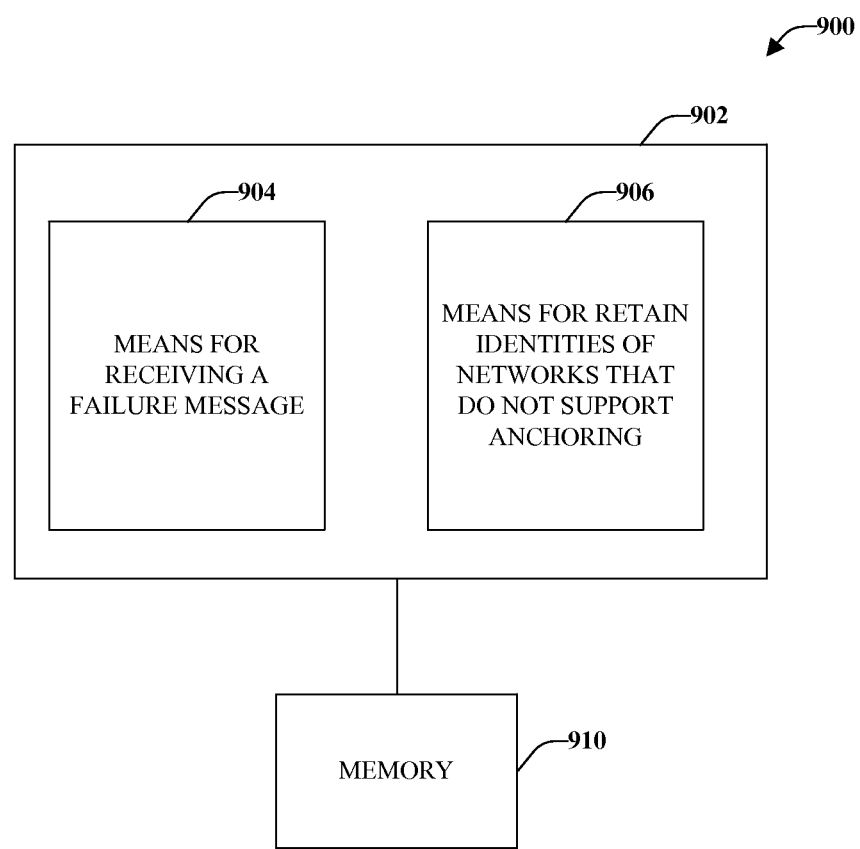
FIG. 9 illustrates an example system that is configured to manage failure scenarios in a wireless communications network according to one or more aspects.

With reference to FIG. 9, illustrated is an example system 900 that is configured to manage failure scenarios in a wireless communications network according to one or more aspects. System 900 may reside at least partially within a mobile device. It is to be appreciated that system 900 is represented as including functional blocks, which may be functional blocks that represent functions implemented by a processor, software, or combinations thereof (e.g., firmware).

System 900 includes a logical grouping 902 of electrical components that can act separately or in conjunction. Logical grouping 902 can include means for receiving 904 a failure response message that indicates a failure during a transfer from a first network to a second network. Also included in logical grouping 902 is means for retaining 906 an identification of the first network in a network listing, wherein the retained identification indicates that the first network does not support call anchoring. The first network can be a circuit switch network and the second network can be a packet service network or the first network can be a packet service network and the second network can be a circuit switch network. A second network listing of identities of networks that support call anchoring can also be maintained.

In accordance with some aspects, logical grouping 902 includes means for preparing to initiate a domain transfer from the first network and means for determining if the identity of the first network is included in the network listing. Also included is means for avoiding the domain transfer if an identity of the first network is included in the network listing.

According to some aspects, logical grouping 902 includes means for attempting a second domain transfer from the first network to another network and means for ascertaining if the first network supports call anchoring if the second transfer is successful. Further, logical grouping 902 can include means for removing the identity of the first network from the network listing.

Logical grouping 902 can include means for receiving a signaling message from the first network and means for removing the identity of the first network from the network listing, according to various aspects. The signaling message can indicate that the first network supports anchoring. The signaling message can be a dedicated message or a broadcast message.

Additionally, system 900 can include a memory 908 that retains instructions for executing functions associated with electrical components 904 and 906, or other components. While shown as being external to memory 908, it is to be understood that one or more of electrical components 904 and 906 can exist within memory 908.

It is to be understood that the aspects described herein may be implemented by hardware, software, firmware or any combination thereof When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for handling failure scenarios for voice call continuity, comprising:
   receiving a failure response message from a first network that indicates a failure during a domain transfer from a first domain to a second domain;
   retaining an identification of the first network in a network listing, wherein the retained identification indicates that the first network does not support call anchoring;
   preparing to initiate a communication in the first network;
   checking the network listing for the identification of the first network; and
   avoiding initiation of the communication in the first network if the identity of the first network is included in the network listing.

2. The method of claim 1, further comprises periodically checking the first network to determine if the first network supports call anchoring.

3. The method of claim 2, wherein periodically checking the first network comprises:
   attempting a second domain transfer from the first network to another network;
   determining the first network supports call anchoring if the second domain transfer is successful; and removing the identity of the first network from the network listing.

4. The method of claim 1, further comprising:
receiving a signaling message from the first network, wherein the signaling message indicates that the first network supports anchoring; and
removing the identity of the first network from the network listing.

5. The method of claim 4, wherein the signaling message is a dedicated message or a broadcast message.

6. The method of claim 1, wherein the first domain is a circuit switch network and the second domain is a packet service network.

7. The method of claim 1, wherein the first domain is packet service network and the second domain is a circuit switch network.

8. The method of claim 1, further comprises retaining a second network listing of identities of networks that support call anchoring.

9. A wireless communications apparatus, comprising:
a memory that retains instructions related to:
receiving a failure response message from a first network and retaining an identification of the first network in a network listing, wherein the failure response message indicates a failure during a domain transfer from a first domain to a second domain and wherein the network listing includes identities of networks that do not support call anchoring;
preparing to initiate a communication in the first network;
determining if the first network is included in the network listing;
avoiding initiation of the communication in the first network if the first network is included in the network listing; and
a processor, coupled to the memory, configured to execute the instructions retained in the memory.

10. The wireless communications apparatus of claim 9, the memory further retains instructions related to periodically checking the first network to determine if the first network supports call anchoring.

11. The wireless communications apparatus of claim 10, the memory further retains instructions related to attempting a second domain transfer from the first network to another network, ascertaining that the first network supports call anchoring if the second domain transfer is successful, and removing the identity of the first network from the network listing.

12. The wireless communications apparatus of claim 9, the memory further retains instructions related to receiving a signaling message from the first network and removing the identity of the first network from the network listing, wherein the signaling message indicates that the first network supports anchoring.

13. The wireless communications apparatus of claim 12, wherein the signaling message is a dedicated message or a broadcast message.

14. The wireless communications apparatus of claim 9, wherein the first domain is a circuit switch network and the second domain is a packet service network.

15. The wireless communications apparatus of claim 9, wherein the first domain is packet service network and the second domain is a circuit switch network.

16. A wireless communications apparatus that manages failure scenarios for voice call continuity, comprising:
means for receiving a failure response message from a first network that indicates a failure during a domain transfer from a first domain to a second domain;
means for retaining an identification of the first network in a network listing, wherein the retained identification indicates that the first network does not support call anchoring;
means for preparing to initiate a domain transfer from the first network;
means for determining if the identity of the first network is included in the network listing; and
means for avoiding the domain transfer if the identity of the first network is included in the network listing.

17. The wireless communications apparatus of claim 16, further comprising:
means for attempting a second domain transfer from the first network to another network;
means for ascertaining if the first network supports call anchoring if the second transfer is successful; and
means for removing the identity of the first network from the network listing.

18. The wireless communications apparatus of claim 16, further comprising:
means for receiving a signaling message from the first network, wherein the signaling message indicates that the first network supports anchoring; and
means for removing the identity of the first network from the network listing, wherein the signaling message is a dedicated message or a broadcast message.

19. A computer program product, comprising:
a non-transitory computer-readable storage medium comprising:
a first set of codes for causing a computer to receive a failure response message from a first network that indicates a failure during a domain transfer from a first domain to a second domain;
a second set of codes for causing the computer to retain an identification of the first network in a network listing, wherein the retained identification indicates that the first network does not support call anchoring;
a third set of codes for causing the computer to prepare to initiate a domain transfer from the first network;
a fourth set of codes for causing the computer to review the network listing for the identification of the first network; and
a fifth set of codes for causing the computer to avoid the domain transfer if the identity of the first network is included in the network listing.

20. The computer program product of claim 19, the non-transitory computer-readable storage medium further comprising:
a sixth set of codes for causing the computer to periodically check the first network to determine if the first network supports call anchoring; and
a seventh set of codes for causing the computer to remove the identity of the first network from the network listing if the first network supports call anchoring.

21. The computer program product of claim 19, the non-transitory computer-readable storage medium further comprising:
a sixth set of codes for causing the computer to receive a signaling message from the first network, wherein the signaling message indicates that the first network supports anchoring; and
a seventh set of codes for causing the computer to remove the identity of the first network from the network listing.

22. At least one processor configured to manage failure scenarios in a wireless communications environment, comprising:
- a first module for receiving a failure response message from a first network that indicates a failure during a transfer from a first domain to a second domain;
- a second module for retaining an identification of the first domain in a network listing, wherein the retained identification indicates that the first network does not support call anchoring;
- a third module for preparing to initiate a communication in the first network;
- a fourth module for checking the network listing for the identification of the first network; and
- a fifth module for avoiding initiation of the communication in the first network if the identity of the first network is included in the network listing.

* * * * *